Jan. 26, 1932.  N. L. THARP  1,842,737
COTTON HARVESTER
Filed March 5, 1931   4 Sheets-Sheet 4
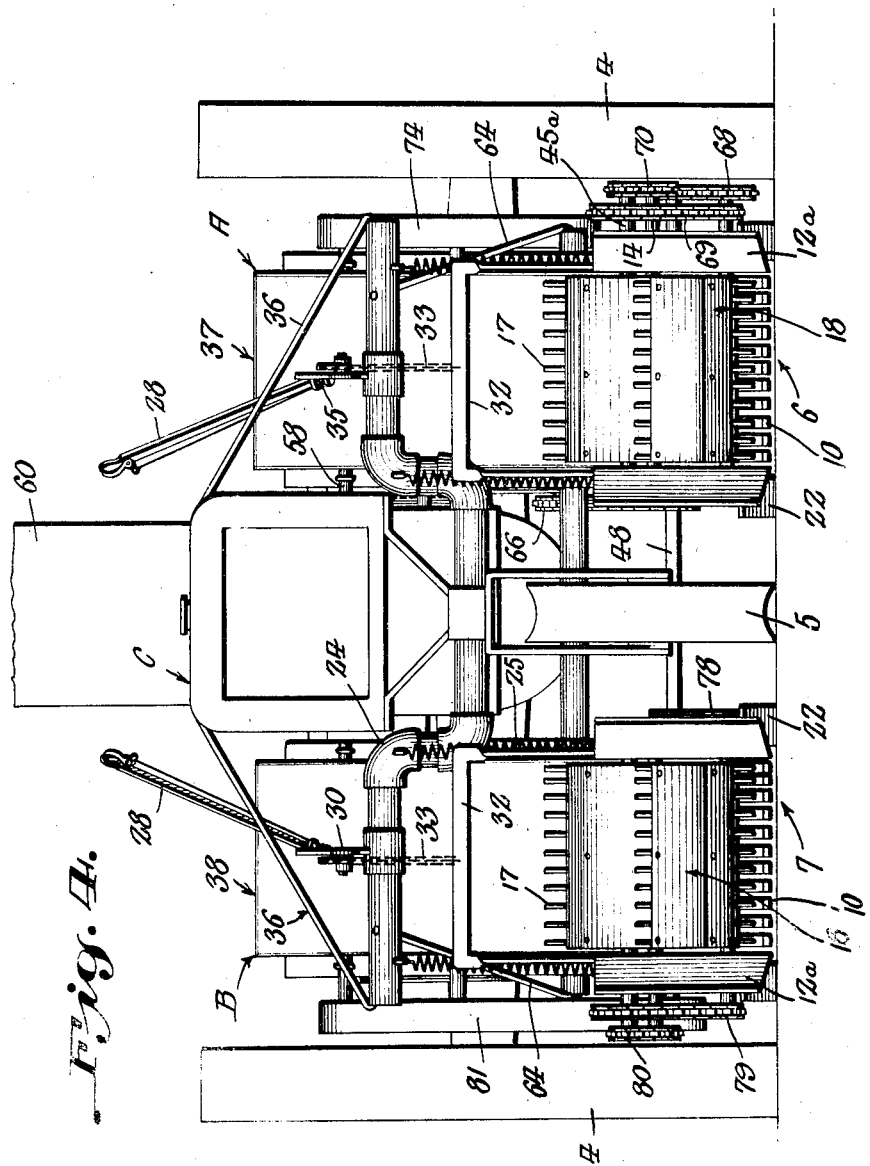

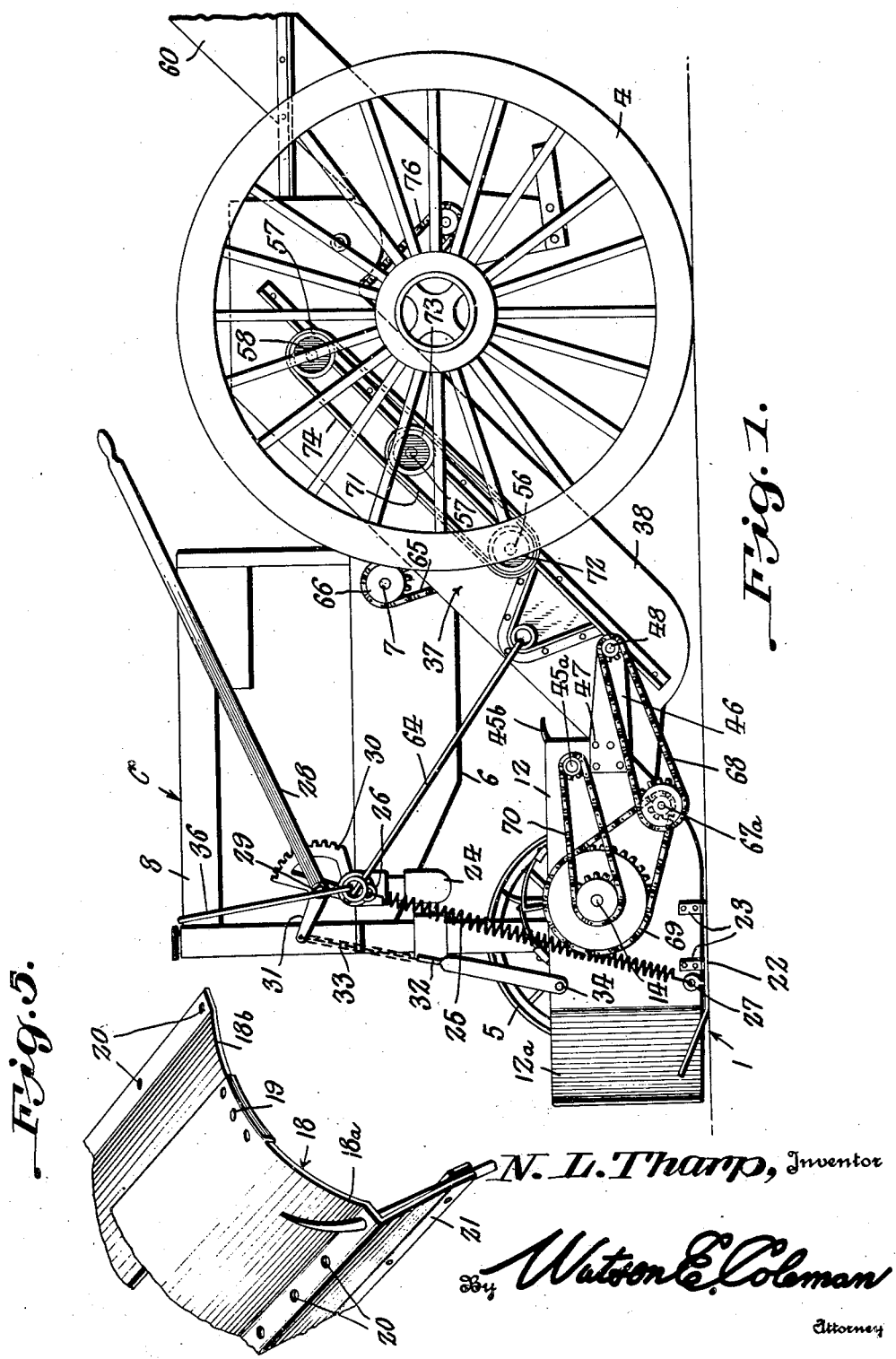

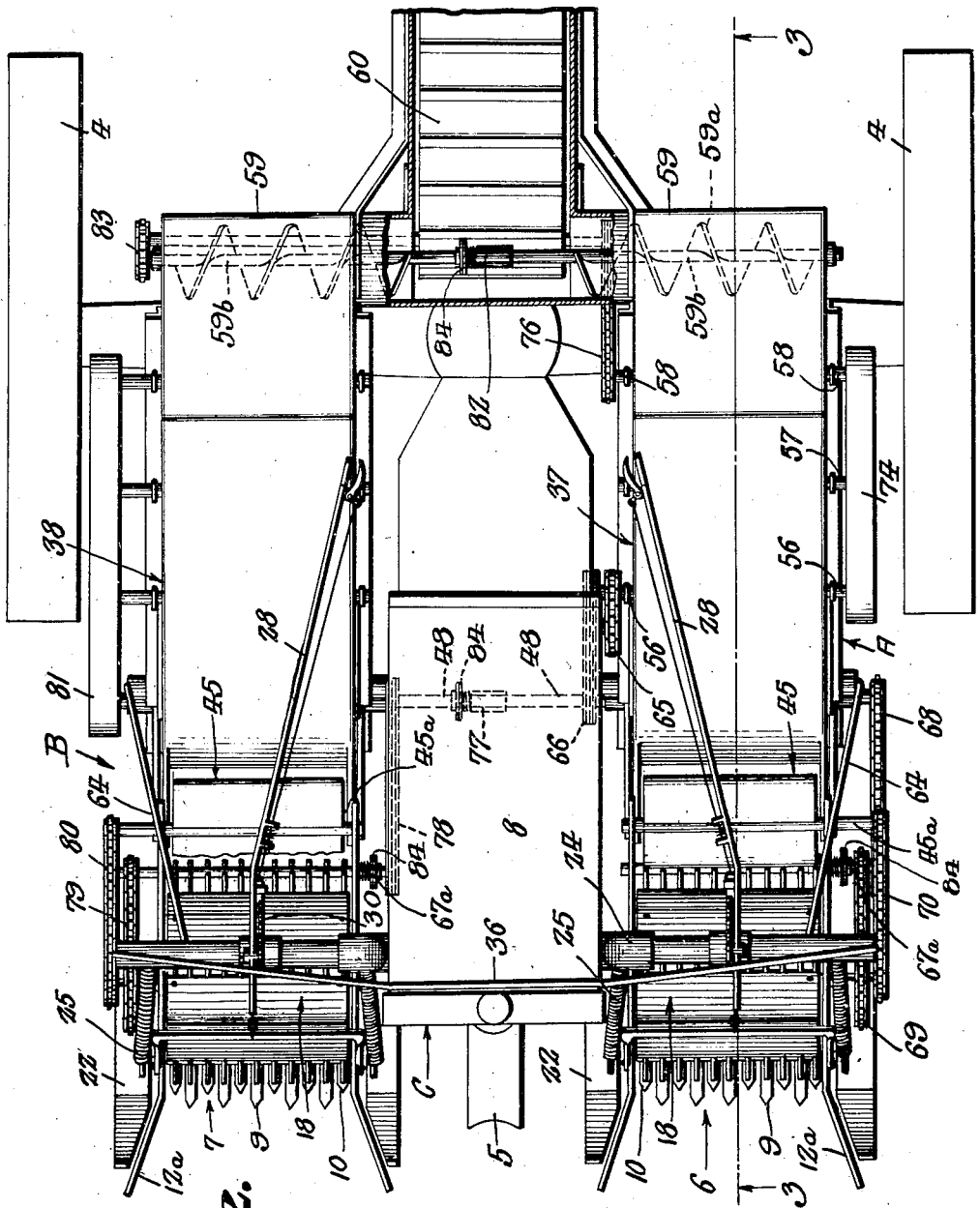

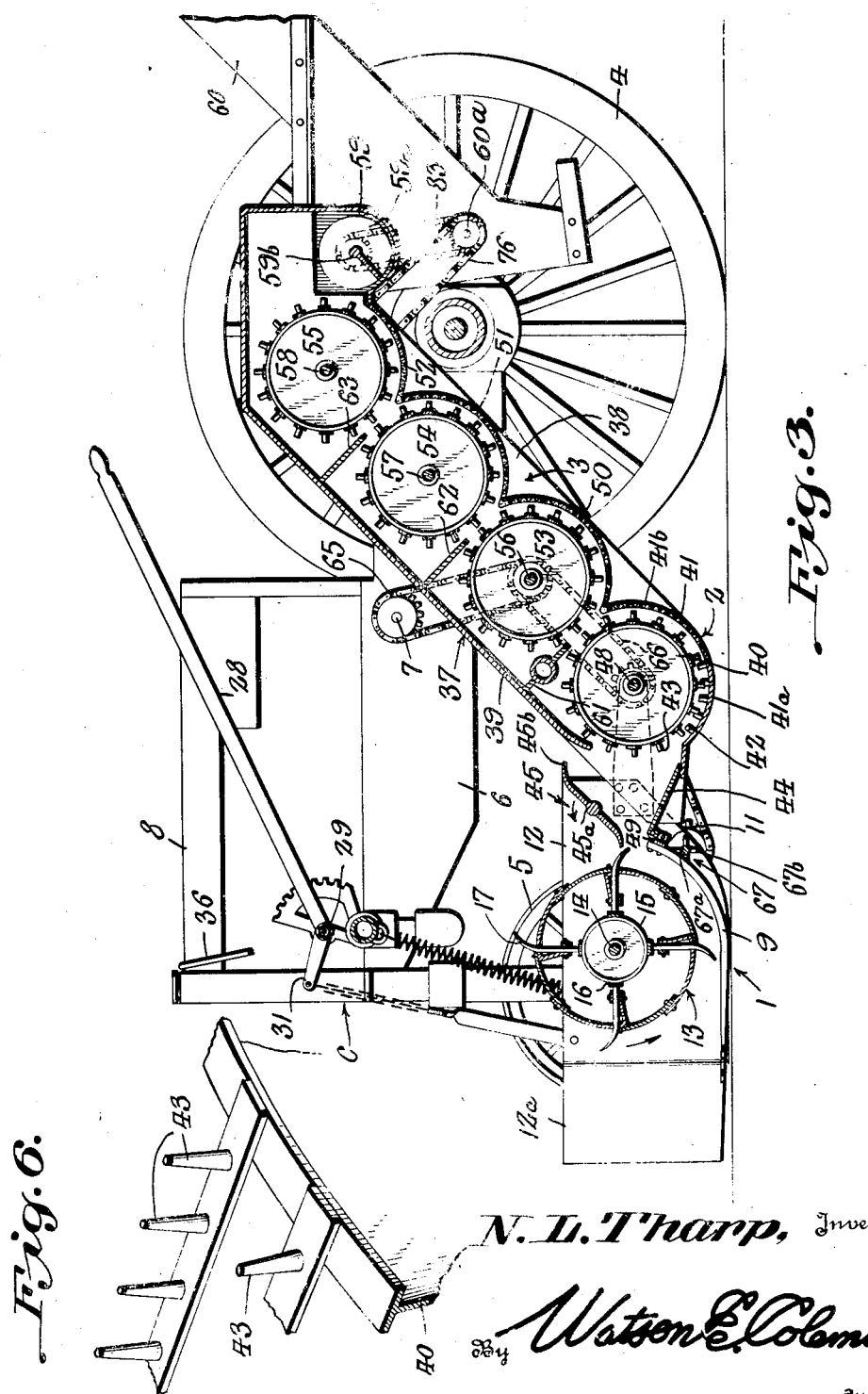

Patented Jan. 26, 1932

1,842,737

UNITED STATES PATENT OFFICE

NATHAN L. THARP, OF CLOVIS, NEW MEXICO

COTTON HARVESTER

Application filed March 5, 1931. Serial No. 520,396.

This invention relates to a cotton harvester, and has for one of its objects to provide a harvester of this character which shall embody a mechanism adapted to pick the opened or unopened bolls from the stalks or plants and gather up the bolls from the ground, a mechanism adapted to receive the bolls from the picking or gathering mechanism and crush the hulls of bolls and separate the cotton from the crushed hulls and other trash, and a mechanism adapted to receive the cotton from the hull crushing mechanism and clean it sufficiently to adapt it for delivery directly to the gin.

The invention has for a further object to provide a cotton harvester of the character stated wherein the gathering or picking mechanism, the hull crushing mechanism and the cleaning mechanism shall be arranged one in rear of the other in the order named, to the end that there may be provided an elongated unit adapted to be mounted upon and extend longitudinally of one side of a tractor.

The invention has for a further object to provide a cotton harvester of the character stated which shall embody a plurality of units of the construction stated adapted to be mounted upon and extend longitudinally of opposite sides of a tractor, which shall embody conveyors into which the cleaned cotton from the units is discharged, and which shall embody an elevator adapted to convey the cotton from the conveyors to a wagon located rearwardly of and hitched to the tractor.

The invention has for a further object to provide a cotton harvester of the character stated which shall embody novel and simple means through the medium of which the mechanisms of the units, the conveyors and the elevator may be operated from the power take-off shaft of the tractor.

The invention has for a further object to provide a cotton harvester of the character stated wherein the mechanisms of the units, the conveyors and the elevator shall be simple, durable and highly efficient, and wherein the units, conveyors and elevator may be readily applied to or removed from the tractor.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view in side elevation of the cotton harvester;

Figure 2 is a top plan view of the cotton harvester;

Figure 3 is a sectional view taken on the vertical plane indicated by the line 3—3 of Figure 2;

Figure 4 is a view in front elevation of the cotton harvester;

Figure 5 is a perspective view of a fragmentary portion of the picking mechanism reel, and Figure 6 is a perspective view of a fragmentary portion of the hull crushing cylinder.

The cotton harvester comprises similar units A and B, each including a gathering or picking mechanism 1, a hull crushing mechanism 2 and a cleaning mechanism 3.

The units A and B are of elongated formation in plan to adapt them to be mounted upon and extend longitudinally of the opposite sides of a tractor. The tractor C to which the units A and B are shown applied, comprises rear or driving wheels 4, a front or steering wheel 5, a frame 6, a power take-off shaft 7 and a frame bar 8. The tractor C is of the row crop type, and as it is of well known construction further description and illustration of the same are deemed unnecessary.

As the units A and B are similar a detail description of the unit A will suffice for both. The gathering or picking mechanism 1 of the unit A is located opposite the tractor wheel 5, and comprises long teeth 9 and short teeth 10 which are arranged in laterally spaced relation with a short tooth between each pair of long teeth. The teeth 9 and 10 are secured to a cross bar 11 which is located above the ground and which is secured to and between plates 12. The teeth 9 and 10 have arcuate rear portions which extend downwardly and forwardly from the cross bar 11 and have straight front portions which incline upwardly at a slight angle from the rear portions. The upper sides of the teeth 9 and 10 are straight transversely to prevent cotton bolls from rolling transversely on the same, and the distance between the teeth is small enough to prevent the bolls from passing between the same. The lateral sides of the teeth 9 and 10 converge downwardly so as to permit the free passage of the soil through the teeth.

The teeth 9 and 10 constitute the bottom and the lower rear end portion of the gathering or picking mechanism 1, and the plates 12 constitute sides of this mechanism.

The sides 12 extend forwardly and rearwardly beyond the teeth 9 and 10, and those portions of the sides that are located forwardly beyond the teeth are arranged in forwardly diverging relation to provide gatherers 12a, which cause all branches of the cotton plants to enter the gathering and picking mechanism 1. This mechanism also comprises a reel 13 which is located above the teeth 9 and 10 and between the sides 12 and which comprises a shaft 14 journaled in the sides, hubs 15 secured to the shaft, bars 16 secured to the hubs, and teeth 17 extending radially from the bars and having their outer end portions curved in a direction reverse to the direction of rotation of the reel. Plates 18 are secured to the reel 13 in spaced relation to the hubs 15 and extend from one row of the teeth 17 to the next adjacent row of the teeth. The plates 18 function to prevent weeds such as Russian thistle and the like from interfering with the gathering of the cotton bolls by the teeth 9, 10 and 17. They attain this end by crushing the weeds between themselves and the teeth 9 and 10. The plates 18 are each of sectional formation, and sections 18a and 18b of each plate are connected together, as at 19, to permit the width of the plates to be varied, and thus adapt them for application to the reel teeth 17 at different distances from the reel hubs 15. Each plate section 18a and 18b is provided with openings 20 for the reception of the reel teeth 17, and each plate section 18a is provided with a clamp 21 through the medium of which it may be secured to a row of these teeth.

The gathering or picking mechanism 1 is mounted upon slides or shoes 22 which are arranged outwardly of the sides 12 and which are secured, as at 23, to the sides. The shoe securing means 23 is adapted to be adjusted on the sides 12 in such manner as to permit the shoes 22 to support the front portion of the teeth 9 and 10 above the ground or slightly embedded in the ground. The teeth 9 and 10 cooperate with the reel 13 in stripping the bolls from the plants, and the teeth also pick up those bolls that are on the ground. When it is not necessary to embed the teeth 9 and 10 in the ground in order to pick up the fallen bolls, the teeth will be supported with their front portions slightly above the ground.

A cross bar 24 is secured to and below the front end portion of the tractor frame 6, and the gathering or picking mechanism 1 is suspended from the cross bar by coil springs 25 which are secured at their upper ends, as at 26, to the cross bar and at their lower ends, as at 27, to the shoes 22. The springs 25 permit the gathering or picking mechanism 1 to yield upwardly as the shoes 22 encounter high places in the ground, to the end that the teeth 9 and 10 may at all times occupy their set position with respect to the surface of the ground. Means through the medium of which the gathering or picking mechanism 1 may be raised and supported in inoperative position, comprises a hand lever 28 which is pivoted, as at 29, to a notched sector 30 fixed to the cross bar 24. The lever 28 extends upwardly and rearwardly from its pivot 29, and is provided with a short arm 31 extending upwardly and forwardly from its pivoted end.

The lever arm 31 is connected to the gathering or picking mechanism 1 by yoke 32 and a chain 33, the yoke being pivotally connected, as at 34, to the sides 12 of the mechanism, and the chain 33 being connected to the yoke and lever arm and permitting the upward and downward movement of the mechanism. The lever 28 is provided with a finger latch 35 adapted to engage the notched sector 30 to support the gathering or picking mechanism 1 in its raised or inoperative position. The outer ends of the cross bar 24 are supported from the tractor frame bar 8 by a yoke 36, which passes over the tractor frame bar 8.

A casing 37 inclines upwardly and rearwardly from the rear end of the gathering or picking mechanism 1, and it comprises imperforated side and top walls 38 and 39, respectively. The hull crushing mechanism 2 is located in the lower or front end of the casing 37 and comprises a toothed cylinder 40 and a concave 41. The front portion 41a of the concave 41 is imperforated, and is provided with teeth 42 with which the teeth 43 of the cylinder 40 cooperate to crush the hulls of the bolls. The rear portion 41b of the concave 41 is perforated, and the perforations thereof are large enough to permit the passage therethrough of trash, dirt and crushed hulls. The hull crushing mechanism 2 is in communication at its front side with the rear end of the gathering or picking mechanism 1. A plate 44 which is secured to the cross bar 11, extends downwardly and rearwardly from the rear ends of the teeth 9 and 10 to the front end of the concave 41. A stripper 45 is located at the rear end of the gathering or picking mechanism 1, rearwardly of the reel 13 and above the plate 44, and comprises a shaft 45a journaled in the sides 12 of this mechanism and two or more wings 45b which extend radially from the shaft as shown.

The stripper 45 removes the cotton bolls from the teeth 17 of the reel 13 and directs them into the hull crushing mechanism 2. The teeth 17 of the reel 13 move bolls on the teeth 9 and 10 on to the plate 44 which directs them into the hull crushing mechanism 2. The gathering or picking mechanism 1 is held in proper relation to the hull crushing mechanism 2 by brackets 46 which are secured, as at 47, to the sides 12 of the gathering or picking mechanism and which are pivoted to the shaft 48 of the cylinder 40, the shaft being journaled in the sides 38 of the casing 37. The plate 44 is pivotally connected, as at 49, to the cross bar 11, and rests at its free edge upon the concave 41. The pivotal connection of the brackets 46 with the shaft 48, and the pivotal connection of the plate 44 with the cross bar 11, permits the free upward and downward movement of the gathering or picking mechanism 1 with respect to the hull crushing mechanism 2.

The cleaning mechanism 3 comprises a series of concaves 50, 51 and 52 arranged in the casing 37 rearwardly of the hull crushing mechanism 2. The concaves 50, 51 and 52 are also arranged one in rear of the other, and associated therewith are tooth cylinders 53, 54 and 55, respectively. The concaves 50, 51 and 52 are perforated, and the openings thereof are large enough to permit the passage therethrough of trash, dirt and the like. The cylinders 53, 54 and 55 are fixed to shafts 56, 57 and 58, respectively, which are journaled in the sides 38 of the casing 37. The cotton is delivered by the tooth cylinder 40 from the hull crushing mechanism 2 to the first concave 50; it is delivered by the cylinder 53 from this concave to the second concave 51; it is delivered by the cylinder 54 from the second concave to the third concave 52, and it is delivered from the third concave into a conveyor 59.

The conveyor 59 is of the screw type and discharges into an elevator 60 which extends upwardly and rearwardly from the tractor C and is adapted to deliver the cotton to a wagon, not shown, which in practice may be hitched to the rear end of the tractor. Partitions 61, 62 and 63 are located between the cylinders 40, 53, 54 and 55, and serve to prevent the cotton from revolving around the cylinders and thus insure its delivery from one to the other. The casing 37 is supported from the cross bar 24 by rods 64.

The cylinder 53 is driven from the power take-off shaft 7 by a sprocket chain 65, and the cylinder 40 is driven from the shaft 56 of the cylinder 53 by a sprocket chain 66. A rake 67 consisting of a shaft 67a journaled in the sides 12 of the gathering or picking mechanism 1 and teeth 67b fixed to the shaft and passing between the teeth 9 and 10, functions to prevent weeds and the like from lodging between the teeth, and is driven from the shaft 48 by a sprocket chain 68. The reel 13 is driven from the shaft 67a by a sprocket chain 69, and the stripper 45 is driven from the reel shaft 14 by a sprocket chain 70. The cylinder 54 is driven from the shaft 56 of the cylinder 53 at a reduced rate by a belt 71 which passes about pulleys 72 and 73 fixed to said shaft and to the shaft 57 of the cylinder 54. The cylinder 55 is driven from the shaft 56 of the cylinder 53 at a rate higher than that of the cylinder 54 by a belt 74 passing about the belt 71 and about a pulley 75 fixed to the shaft 58 of the cylinder 55. The lower shaft 60a of the conveyor 60 is driven from the shaft 58 of the cylinder 55 by a sprocket chain 76.

The sprocket chain 65 is connected directly with the cylinder shaft 56 of the unit A, and the cylinder shaft 48 of this unit and the corresponding shaft of the unit B are detachably connected by a coupling 77 in order to establish driving connection between the power take-off shaft 7 and the shaft 48 of the unit B. The rake 67 of the unit B is driven from the shaft 48 of this unit by a sprocket chain 78 and the reel 13 of this unit is driven from the rake shaft 67a by a sprocket chain 79. The stripper 45 of the unit B is driven from the reel shaft 14 of this unit by a sprocket chain 80. The cylinders 53, 54 and 55 of the unit B are driven from the cylinder shaft 48 of this unit by belts and pulleys similar to those designated 71—75, only one of which is shown and designated 81.

The shafts 59b of the conveyors 59 are connected together by a coupling 82, and these shafts are driven from the conveyor shaft 60a by a sprocket chain 83. The lower or receiving end of the elevator 60 is located between the conveyors 59, and the conveyors discharge at their inner ends onto the elevator.

From the foregoing description, taken in connection with the accompanying drawings, it should be understood that as the harvester advances along the field the plants of two rows will be stripped of their cotton by the gathering or picking mechanisms 1, and that the cotton bolls on the ground will be picked up by the teeth 9 and 10 of these mechanisms. As the reels 13 of these mechanisms rotate they carry the cotton bolls on the teeth 9 and 10 rearwardly on to the plates 44 which direct them into the hull crushing mechanisms 2, and the strippers 45 will remove the cotton from the reels and direct it into the hull crushing mechanisms.

In addition to crushing the hulls of the bolls, the mechanisms 2 will separate the trash, dirt and hulls from the cotton and deliver the cotton to the first units of the cleaning mechanisms 3. The cotton is again subjected to a cleaning action in these units, and is then delivered to the next units of these mechanisms where it is again subjected to a cleaning action. The cotton is then delivered to the final units of the cleaning mechanisms where it is also again subjected to a cleaning action and passes from these units into the conveyors 59. The cotton discharges from the conveyors 59 on to the elevator 60 which carries it to the wagon. As the cylinders 53, 54 and 55 of the cleaning mechanisms 3 are rotated at different speeds, the cleaning action to which the cotton is subjected is such as to enable the cotton to be delivered from the field directly to the gin.

The harvester units A and B may be easily applied to or removed from a tractor. The tractor may be of any appropriate type and it may have one or two steering wheels. If desired, the harvester may consist of more than two units, and also if desired, it may consist of but a single unit.

The shafts 48, 59b and 67a are all provided with slip clutches, each of which is indicated by the numeral 84, of any suitable character which will prevent damage to these shafts in the event that the elements rotated thereby become jammed for any reason or in the event that one of the two elements upon each of the shafts 48 and 59b becomes caught or tends, because of a drag placed thereon, to rotate slower than the adjacent element.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. A cotton harvester comprising a tractor having a power take-off shaft, similar units arranged at opposite sides of and extending longitudinally of the tractor and each including a gathering or picking mechanism, a hull crushing mechanism and a cleaning mechanism, the gathering or picking mechanisms being arranged at opposite sides of the front portion of the tractor, the hull crushing mechanisms being located rearwardly of the gathering or picking mechanisms and receiving the cotton bolls therefrom and the cleaning mechanisms being located rearwardly of the hull crushing mechanisms and receiving the cotton therefrom, axially alined conveyors located at the rear end of the tractor and receiving the cotton from the cleaning mechanisms, and an elevator located at the rear end of the tractor and having its receiving end arranged between the conveyors.

2. A cotton harvester including a gathering or picking mechanism embodying side members, teeth located between the side members, a toothed reel journaled between the side members above the teeth, a stripper journaled between the side members rearwardly of the reel, weed crushing plates carried by the teeth of the reel, and means adapted to secure the plates to the teeth and at different distances from the outer ends of the latter.

3. A cotton harvester comprising a tractor, a gathering or picking mechanism located at one side of the tractor, ground contacting shoes carried by said mechanism, means yieldingly suspending said mechanism from the tractor, a hull crushing mechanism located rearwardly of said first mechanism and adapted to receive the cotton bolls therefrom, a cleaning mechanism located rearwardly of said second mechanism and adapted to receive the cotton therefrom, means mounting said hull crushing and cleaning mechanism on the tractor, and means pivotally connecting said gathering or picking mechanism to the hull crushing mechanism.

4. A cotton harvester comprising a tractor, an upwardly and rearwardly inclined casing located at one side of the tractor and provided with a longitudinal series of perforated concaves, teeth carried by the foremost concave, toothed cylinders journaled above the concaves, a gathering or picking mechanism located at the front end of the casing and pivotally secured thereto, means yieldingly suspending said mechanism from the tractor, means by which said mechanism may be raised into and supported in inoperative position, and means for operating said mechanism and for operating the cylinders at different speeds.

5. A cotton harvester including a gathering or picking mechanism, a concave located rearwardly of said mechanism, means pivotally connecting said mechanism to the concave, a plate pivoted to said mechanism and resting upon the concave to direct the cotton bolls from said mechanism to the concave, and a toothed cylinder rotatably mounted with relation to the concave.

6. A cotton harvester including a gathering or picking mechanism embodying a toothed reel, a concave located rearwardly of said mechanism, means pivotally connecting said mechanism to the concave, a plate pivoted to said mechanism rearwardly of the reel and resting upon the concave to convey the cotton bolls from the mechanism to the concave, a stripper journaled rearwardly of the reel and adapted to remove the cotton bolls from the reel and over said plate into the concave, and a toothed cylinder supported rotatably with relation to the concave.

7. A cotton harvester including a gathering or picking mechanism embodying teeth, a toothed reel journaled above the teeth, crushing plates carried by the teeth of the reel, and means adapted to secure the crushing plates to the teeth at different distances from the outer ends of the latter.

In testimony whereof I hereunto affix my signature.

NATHAN L. THARP.